United States Patent
Kim et al.

(10) Patent No.: US 6,958,950 B2
(45) Date of Patent: Oct. 25, 2005

(54) METHOD OF VISUALIZING SOUND FIELDS OF INDIVIDUAL SOUND SOURCES USING ACOUSTIC HOLOGRAPHY

(75) Inventors: Yang Hann Kim, Daejeon (KR); Kyoung Uk Nam, Bucheon-si (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 10/758,431

(22) Filed: Jan. 14, 2004

(65) Prior Publication Data

US 2004/0151066 A1 Aug. 5, 2004

(30) Foreign Application Priority Data

Jan. 14, 2003 (KR) .............................. 10-2003-0002354

(51) Int. Cl.[7] ............................................... G03H 3/00
(52) U.S. Cl. ......................................................... 367/8
(58) Field of Search ................................. 367/8; 73/603

(56) References Cited

U.S. PATENT DOCUMENTS

| | | |
|---|---|---|
| 4,415,996 A | 11/1983 | Maynard et al. |
| H1330 H * | 7/1994 | Williams ........................ 367/8 |
| 5,986,971 A | 11/1999 | Kim et al. |
| 2004/0151066 A1 * | 8/2004 | Kim et al. ........................ 367/8 |

FOREIGN PATENT DOCUMENTS

| | | |
|---|---|---|
| KR | 10-0217872 | 8/1998 |
| KR | 10-0366206 | 3/2002 |

OTHER PUBLICATIONS

Article: "Holographic Imaging without the Wavelength Resolution Limit" Earl G. Williams and J. D. Maynard, printed in vol. 45, No. 7 of The American Physical Society on Aug. 18, 1980.

(Continued)

*Primary Examiner*—Daniel Pihulic
(74) *Attorney, Agent, or Firm*—Graybeal Jackson Haley

(57) ABSTRACT

The present invention relates generally to a method of visualizing the sound fields of sound sources using acoustic holography, which discriminates the sound fields of individual sound sources having the same frequency component and visualizes the sound fields thereof.

In the method, sound pressures are calculated on a sound source plane using sound pressures measured on a hologram plane. A single sound source having a position of a maximum sound pressure on the sound source plane is extracted, and a value of the sound pressure at the position is evaluated as a signal coherent to the sound source. A sound field of the extracted sound source is obtained using the coherent signal. The sound field is eliminated from sound fields of all sound sources, and it is determined whether any remaining sound field exists. The process returns to the sound field obtaining operation if any remaining sound field exists.

3 Claims, 8 Drawing Sheets

OTHER PUBLICATIONS

Article: "STSF—a unique technique for scan–based Near–field Acoustic Holography without restrictions on coherence" by Jorgen Hald, printed in Bruel & Kjaer Technical Review, vol. 1, 1989.

Article: "Moving fram technique for planar acoustic holography" by Hyu–Sang Kwon and Yang–Hann Kim, printed in J. Acoust. Soc. Am 103(4), pp 1734–1741, Apr. 1998.

Article: "Nearfield acoustic holography: I. Theory of generalized holography and the development of NAH" by J.D. Maynard, E. G. Willaims and Y. Lee, printed in J. Acoust. Soc. Am. 78(4), pp 1395–1413, Oct. 1985.

Article: "Digital holographic reconstruction of sources with arbitrarily shaped surfaces" by W. A. Veronesi and J. D. Maynard, printed in J. Acoust. Soc. Am. 85(2), pp. 588–598, Feb. 1989.

Article: "Multi–Reference Nearfield Acoustical Holography" by Darren Hallman and J. Stuart Bolton, printed in Inter–noise magazine, Toronto, Canada on Jul. 20–22, 1992, pp. 1164–1169.

Article: "Separation of leading edge, trailing edge, and sidewall noise sources from rolling tires" by Richard J. Ruhala and Courtney B. Burroughs, printed for Noise–Con 98, Ypsilanti, Michigan, Apr. 5–8, 1998, pp 109–114.

Article: "Partial field decomposition in nearfield acoustical holography by the use of singular value decomposition and partial coherence procedures" by Hyu–Sang Kwon and J. Stuart Bolton, printed for Noise–Con 98, Ypsilanti, Michigan, Apr. 5–8, 1998, pp 649+.

* cited by examiner

METHOD OF VISUALIZING SOUND FIELDS OF INDIVIDUAL SOUND SOURCES USING ACOUSTIC HOLOGRAPHY

PRIORITY CLAIM

This application claims priority from Korean Patent Application No. 10-2003-0002354 filed 14 Jan. 2003, which is herein incorporated by reference.

FIELD OF THE INVENTION

The present invention relates generally to a method of visualizing the sound fields of sound sources using acoustic holography, and more particularly, to a method which discriminates the sound fields of individual sound sources having the same frequency component and visualizes the sound fields thereof.

DESCRIPTION OF THE RELATED ART

Generally, acoustic holography is a method of predicting acoustic quantities, such as sound pressure, sound velocity and sound intensity, at arbitrary positions by measuring sound pressures on a two-dimensional plane called a hologram plane. The positions and radiation characteristics of sound sources can be detected using such acoustic holography. The acoustic holography has been widely researched and used in various fields, such as the automobile industry, munitions industry, and educational laboratories for researching acoustics.

Near-field acoustic holography allowing actual sound sources to be detected was proposed by Williams and Maynard, and is disclosed in a thesis, "Holographic imaging without the wavelength resolution limit" of Phys, Rev. Let., 45, 554–557, 1980 by E. G. Williams and J. D. Maynard, and research on the application and improvement thereof have continuously progressed.

Several conventional methods are disclosed below for methods of measuring sound pressures on a hologram plane. First, a method of simultaneously measuring sound pressures at all measurement points is disclosed in U.S. Pat. No. 4,415,966 entitled "Nonwavelength-limited holographic sound field reconstruction" issued in 1983 to J. D. Maynard and E. G. Williams. Second, a method of sequentially measuring sound pressures is disclosed in a thesis, "STSF-a unique technique for scan-based near-field acoustic holography without restrictions on coherence" of B&K Technical Review No. 1, 1989, by J. Hald. Third, a method of continuously measuring sound pressures is disclosed in a thesis, "Moving frame technique for planar acoustic holography" of J. Acoust. Soc. AM., 103, 1734–1741, 1998 by H. S Kwon and Y. H. Kim. Fourth, a system and method for visualizing acoustic characteristics by measuring hologram of a moving sound source is disclosed in Korean Pat. No. 217872 issued in 1998 to Y. H. Kim and H. S. Kwon.

Further, a system and method for visualizing band-limited noise and a system and method for monitoring the state of transportation machinery using the same are disclosed in Korean Pat. No. 366206.

An acoustic holography method measures sound pressures using planar acoustic holography, cylindrical acoustic holography, spherical acoustic holography and the like according to the shape of a hologram plane, and is disclosed in a thesis, "Nearfield acoustic holography: I. Theory of generalized holography and development of NAH" of J. Acoust. Soc. Am., 78, 1395–1413, 1985 by J. D. Maynard, E. G. Williams and Y. Lee.

Further, an acoustic holography method, which can be applied to a hologram plane with arbitrarily shaped surfaces on the basis of a boundary element method, has been developed and is disclosed in a thesis, "Digital holographic reconstruction of sources with arbitrarily shaped surfaces" of J. Acoust. Soc. Am., 85, 588–598, 1989 by W. A. Veronesi and J. D. Maynard.

The above research on the acoustic holography mainly focuses on obtaining all sound fields. If there are multiple sound sources having the same frequency component, only the sum of individual sound fields other than the individual sound fields of individual sound sources can be obtained based upon the research.

Meanwhile, if multiple sound sources exist, conventional methods of obtaining sound fields created by individual sound sources under the condition where a sound field is stationary and sound sources are incoherent, are described below.

Hald attempted to obtain individual sound fields using singular value decomposition, which is disclosed in a thesis, "STSF-a unique technique for scan-based near-field acoustic holography without restrictions on coherence" of B&K Technical Review No. 1, 1989 by J. Hald. Further, Hallman and Bolton attempted to obtain individual sound fields on the basis of a partial coherence method, which is disclosed in a thesis, "Multi-reference near-field acoustic holography" of Proc. Of Inter-Noise 92, 1165–1170, 1992 by D. Hallman and J. S. Bolton. Further, Kwon and Bolton proposed a method of obtaining individual sound fields using a residual method, which is disclosed in a thesis, "Partial field decomposition in nearfield acoustical holography by the use of singular value decomposition and partial coherence procedures" of Proc. Of Noise-Con 98, 649–654, 1989 by H. S. Kwon and J. S. Bolton. Ruhala and Burroughs proposed a method of correcting the partial coherence method, which is disclosed in a thesis, "Separation of leading edge, trailing edge, and sidewall sound sources from rolling tires" of Proc. Of Noise-Con 98, 109–114, 1998 by R. J. Ruhala and C. B. Burroughs.

However, these methods are problematic in that sensors must be arranged dose to the individual sound sources to detect in advance the positions of the sound sources. Further, these methods are problematic in that, since the positions of the sound sources are detected in advance before the acoustic holography is performed, these methods are contradictory to the acoustic holography aiming to locate the positions of sound sources.

A method of obtaining sound fields created by individual sound sources in a frequency domain under the condition where a sound field is stationary and the sound sources are incoherent will be described below.

FIG. 1 is a block diagram of a typical single-input/single-output system, and FIG. 2 is a block diagram of a typical two-input/single-output system.

In FIG. 1, an input signal $X(f)$ is distorted due to a noise component $N(f)$ and then output as an output signal $\hat{Y}(f)$. At this time, the noise component $N(f)$ is incoherent to the input signal $X(f)$. If the output signal $\hat{Y}(f)$ and the input signal $X(f)$ are simultaneously measured, the auto-spectrum of an output signal $Y(f)$, not distorted, can be obtained by Equation [1], $$S_{YY}(f) = \frac{|S_{XY}(f)|^2}{S_{XX}(f)} \quad [1]$$

where $S_{XX}(f)$ is the auto-spectrum of the input signal $X(f)$, and $S_{XY}(f)$ is the cross spectrum of the input signal $X(f)$ and the measured output signal $\hat{Y}(f)$.

If a signal linear or coherent to the input signal $X(f)$, such as $R(f)$ of the following Equation [2], instead of the input signal $X(f)$, is measured and then applied to Equation [1], Equation [1] can be expressed by Equation [3].

$$R(f) = C(f)X(f) \quad [2]$$

$$S_{YY}(f) = \frac{|S_{RY}(f)|^2}{S_{RR}(f)} \quad [3]$$

In FIG. 2, if two input signals $X_1(f)$ and $X_2(f)$ are independently operated, that is, incoherent, the auto-spectrum of an output signal $Y(f)$ is expressed by the sum of the contributions of the individual input signals or sound sources as shown in Equation [4].

$$S_{YY}(f) = S_{Y1Y1}(f) + S_{Y2Y2}(f) \quad [4]$$

where $S_{Y1Y1}(f)$ is the contribution of the first input signal, and $S_{Y2Y2}(f)$ is the contribution of the second input signal.

Since the $X_1(f)$ and $X_2(f)$ are incoherent, the output obtained by the $X_2(f)$ is only noise from the point of view of the $X_1(f)$. Therefore, if the output signal $Y(f)$ and the first input signal $X_1(f)$ or a signal $R_1(f)$ coherent to the $X_1(f)$ are measured, the contribution of the first input signal $X_1(f)$ can be obtained by Equation [5].

$$S_{Y1Y1}(f) = \frac{|S_{X1Y}(f)|^2}{S_{X1X1}(f)} = \frac{|S_{R1Y}(f)|^2}{S_{R1R1}(f)} \quad [5]$$

As described above, if multiple independent or incoherent sound sources exist in an acoustic system, input signals of individual sound sources or signals coherent to the sound sources must be obtained so as to obtain the contributions of individual sound sources to the output spectrum.

The input signals of individual sound sources or signals coherent thereto can be obtained from vibrations or sound pressure signals generated close to the individual sound sources. As described above, the method of obtaining sound fields created by the individual sound sources using acoustic holography is disadvantageous in that the sound fields can be obtained only when the vibrations or sound pressure signals of the individual sound sources are measured while sensors such as reference microphones are arranged close to the individual sound sources.

With all the above descriptions taken into consideration, the conventional acoustic holography method can obtain only the sum of sound fields of the individual sound sources other than the individual sound fields thereof if multiple sound sources having the same frequency component exist.

Moreover, the conventional acoustic holography method is problematic in that, since it obtains individual sound fields using signals measured through sensors arranged dose to the sound sources, the positions of the sound sources must be detected in advance before holography is performed.

SUMMARY OF THE INVENTION

Accordingly, the present invention has been made keeping in mind the above problems occurring in the prior art, and an object of the present invention is to provide a method of visualizing the sound fields of individual sound sources using acoustic holography, which evaluates the value of a maximum sound pressure on a sound source plane as a signal coherent to a specific sound source using sound pressures measured on a hologram plane, and obtains the sound field of the sound source using the coherent signal without measuring the positions of the sound sources before acoustic holography is performed.

In order to accomplish the above object, the present invention provides a method of visualizing sound fields of individual sound sources using acoustic holography, comprising the steps of a) calculating sound pressures on a sound source plane using sound pressures measured on a hologram plane; b) extracting a maximum sound pressure on the sound source plane, and evaluating a value of the sound pressure at the position as a signal coherent to a specific sound source; c) obtaining a sound field of the extracted sound source using the coherent signal; d) eliminating the sound field of the extracted sound source from sound fields of all sound sources, and determining whether any remaining sound field exists; and e) returning to the step b) if any remaining sound field exists at step d).

Preferably, the sound field of the extracted sound source at step c) is obtained by calculating contribution of each of the sound sources using the coherent signal in a spectral matrix consisting of auto-spectra at individual points on the sound source plane and cross spectra between different points.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a graph showing the spectrum of a sound pressure measured by a single reference microphone if only a single speaker is driven in FIG. 4a;

DESCRIPTION OF THE PREFERRED EMBODIMENTS

Hereinafter, a method of visualizing sound fields of individual sound sources using acoustic holography according to embodiments of the present invention will be described in detail with reference to the attached drawings.

Figure 1:
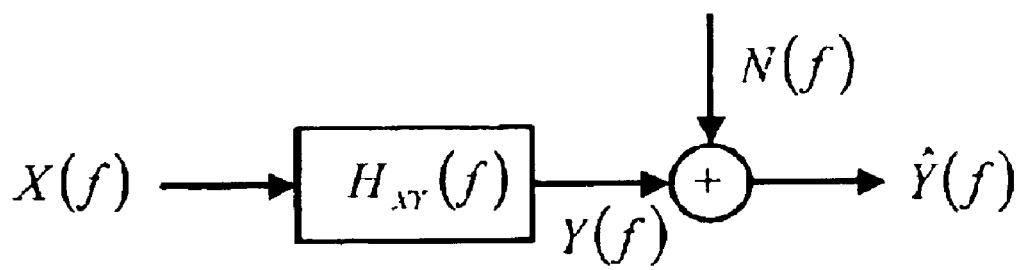
FIG. 1 is a block diagram of a typical single-input/single-output system.
Figure 2:
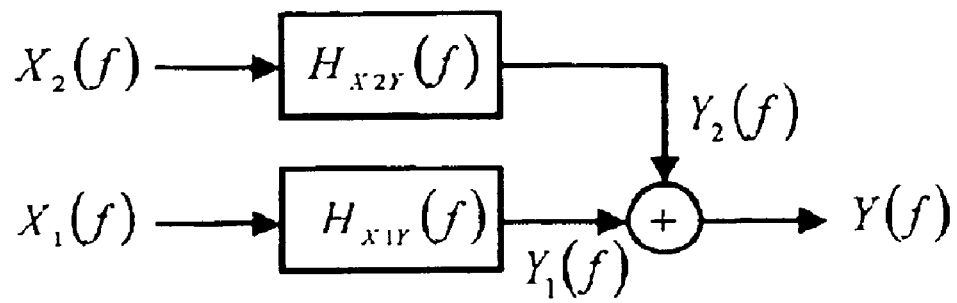
FIG. 2 is a block diagram of a typical two-input/single-output system.
Figure 3A:
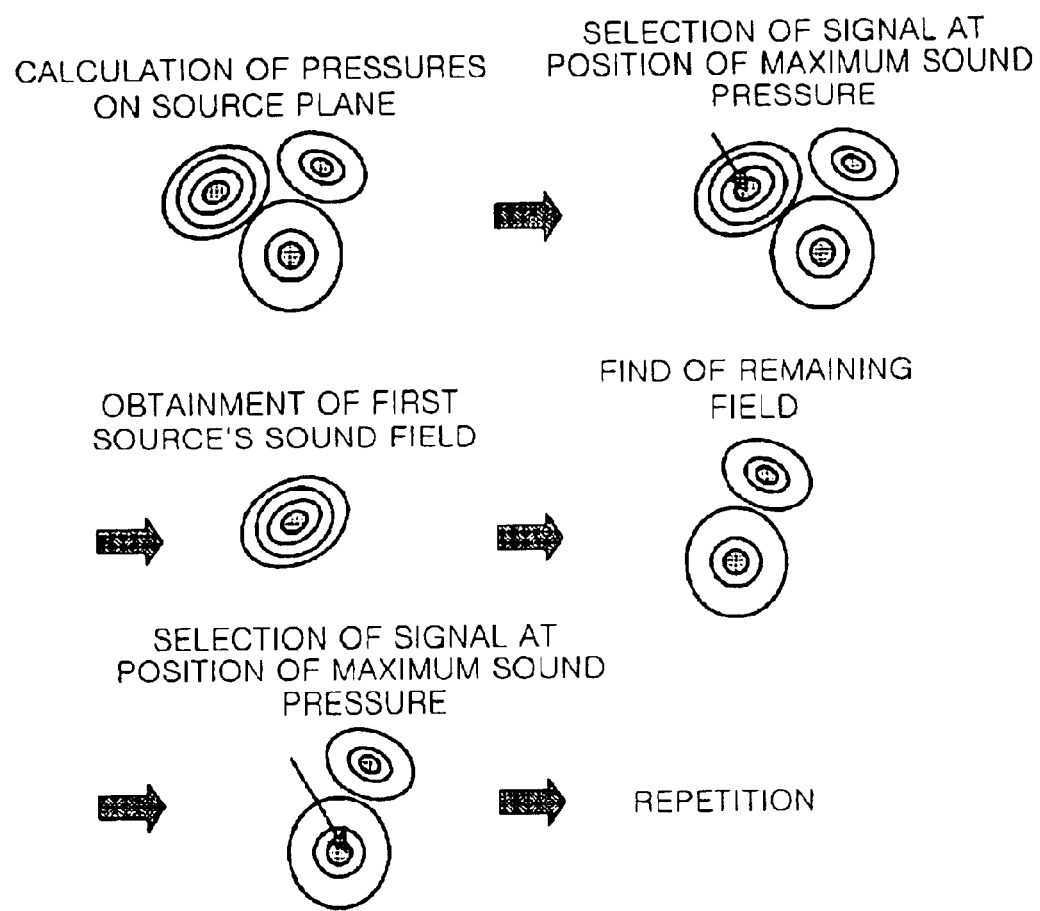
FIGS. 3a and 3b are a conceptual view and a flowchart of a signal processing method to obtain sound fields of individual sound sources according to the present invention, respectively.
Figure 3B:
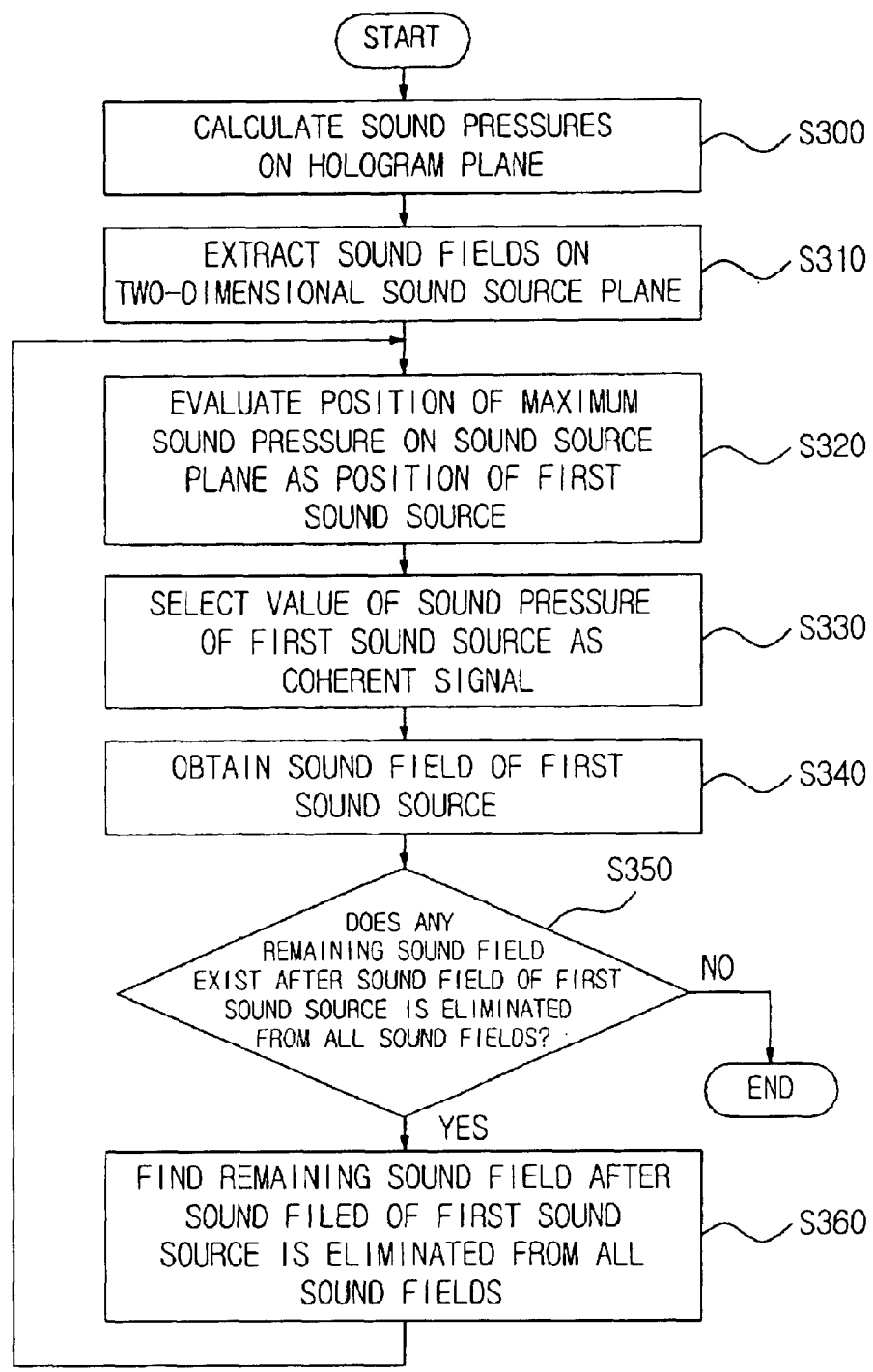

FIGS. 3a and 3b are a conceptual view and a flowchart of a signal processing method to obtain the sound fields of individual sound sources according to the present invention, respectively.

Referring to FIG. 3b, the sound pressures on a hologram plane are measured (step S300).

Next, a total sound field of a two-dimensional sound source plane on which sound sources are arranged is obtained using an acoustic holography method (step S310).

Thereafter, the position where a sound pressure has a maximum value on the sound source plane is determined as the position of a first sound source, and the value of the sound pressure of the first sound source is selected as a signal coherent to the first sound source (steps S320 and S330).

Further, a sound field created by the first sound source is obtained using the coherent signal selected at step S320 (step S340).

Further, it is determined whether any remaining sound field exists after the sound field created by the first sound source is eliminated from the total sound field (step S350).

Thereafter, if any remaining sound field exists after the first sound field is eliminated from the total sound field, the remaining sound field steps S320 to S350 are repeatedly applied to (step S360).

The above process is repeatedly carried out until all of the individual sound fields created by the individual sound sources are obtained.

The above-described process is carried out so that, after the individual sound sources and signals coherent thereto are selected from a spectral matrix including of auto-spectra at individual points on the sound source plane and cross spectra between different points, the sound fields created by the individual sound sources are discriminated from each other by using the coherent signals.

Hereinafter, the above process is described in detail with reference to equations.

If sound pressures at N positions on the sound source plane, measured at step S300, are $P_{S1}(f), P_{S2}(f), \ldots, P_{SN}(f)$, respectively, a spectral matrix $S_{SS}(f)$ consisting of auto-spectra at individual points on the sound source plane and cross spectra between different points is expressed by the following Equation [6], $$S_{SS}(f) = E\left\{\begin{pmatrix} P_{S1}^*(f) \\ M \\ P_{SN}^*(f) \end{pmatrix} [P_{S1}(f) \wedge P_{SN}(f)]\right\}$$

$$= \begin{vmatrix} E[P_{S1}^*(f)P_{S1}(f)] \wedge E[P_{S1}^*(f)P_{SN}(f)] \\ M \quad O \quad M \\ E[P_{SN}^*(f)P_{S1}(f)] \wedge E[P_{SN}^*(f)P_{SN}(f)] \end{vmatrix}$$

[6]

where E is an expected value, and * is a conjugate complex number or a conjugate transpose operation.

At step S310, the performance of acoustic holography at a stationary random sound field is equal to the obtainment of the spectral matrix as shown in Equation [6] for obtaining sound pressures or sound velocities on the sound source plane or other planes by measuring sound pressures on the hologram plane.

$S_{SS}(f)$ of Equation [6] can be expressed by the sum of the contributions of M sound sources as shown in the following Equation [7], similar to Equation [4] obtained in the case where M independent or incoherent sound sources exist.

$$S_{SS}(f) = S_{S1S1}(f) + \Lambda + S_{SNSN}(f)$$ [7]

where $S_{SiSi}(f)$ is the contribution of an i-th sound source.

A rank of $S_{SS}(f)$ of Equation [6] is determined by the number of independent sound sources, and the value thereof is M. Further, since $S_{SS}(f)$ is Hermitian and positive semi-definite, it can be decomposed as the following Equation [8].

$$S_{SS}(f) = \Gamma^*_S(f)\Gamma_S(f)$$ [8]

where $\Gamma_S(f)$ is a M×N matrix, and is not uniquely determined. The $S_{SS}(f)$ expressed by Equation [7] can be decomposed using any decomposition method, such as a singular value decomposition or LU (Lower triangular matrix and Upper triangular matrix) decomposition method.

In Equation [8], if an m-th column of the $\Gamma_S(f)$ is expressed by $\Gamma_{S,m}(f)$, the auto-spectrum of a sound pressure at m-th position on the sound source plane can be expressed by $\Gamma^*_{S,m}(f)\Gamma_{S,m}(f)$. Further, if the position where the auto-spectrum has a maximum value is $m_{max}$, and an $m_{max}$-th column of the $\Gamma_S(f)$ is $\Gamma_{S,max}(f)$, the contribution of the first sound source to the $S_{SS}(f)$ can be obtained by the following Equation [9].

$$S_{S1S1}(f) = \frac{\Gamma^*_S(f)\Gamma_{S,max}(f)\Gamma^*_{S,max}(f)\Gamma_S(f)}{\Gamma^*_{S,max}(f)\Gamma_{S,max}(f)}$$ [9]

In the spectral matrix $S_{SS}(f)$ consisting of auto-spectrums at individual points on the sound source plane and cross spectrums between different points, a spectral matrix $S_{SS-1}(f)$ consisting of remaining contributions after the contribution of the first sound source expressed by Equation [9] is eliminated can be obtained by Equation [10].

$$S_{SS-1}(f) = S_{SS}(f) - S_{S1S1}(f)$$ [10]

As described above, a procedure for obtaining a spectral matrix consisting of remaining contributions after the contribution of one sound source is eliminated from the spectral matrix $S_{SS}(f)$ consisting auto-spectra at individual points on the sound source plane and cross spectra between different points, and a procedure for eliminating the contribution of another sound source from the spectral matrix and obtaining a spectral matrix consisting of the remaining contributions, are repeatedly performed. Therefore, the contributions or sound fields of the individual sound sources can be obtained.

Figure 4A:
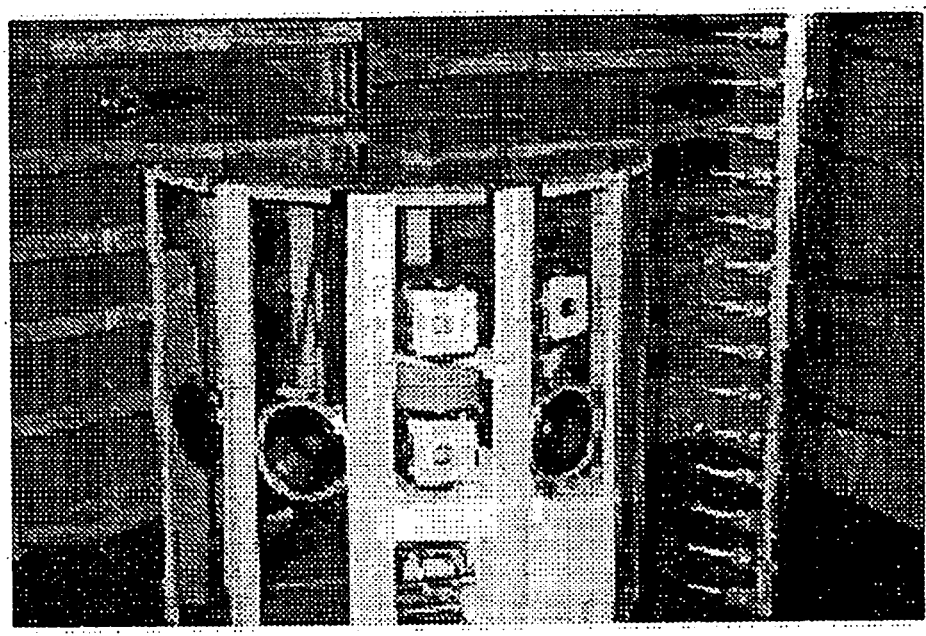
FIG. 4a is a perspective view of an acoustic holography system according to an embodiment of the present invention.
Figure 4B:
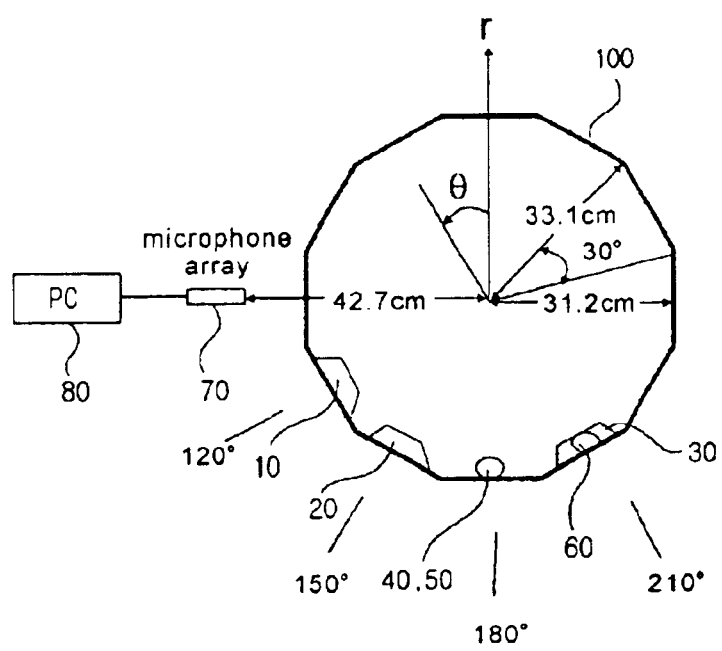
FIGS. 4b and 4c are upper and side views of a speaker experiment device for verifying the acoustic holography system of FIG. 4a, respectively.
Figure 4C:
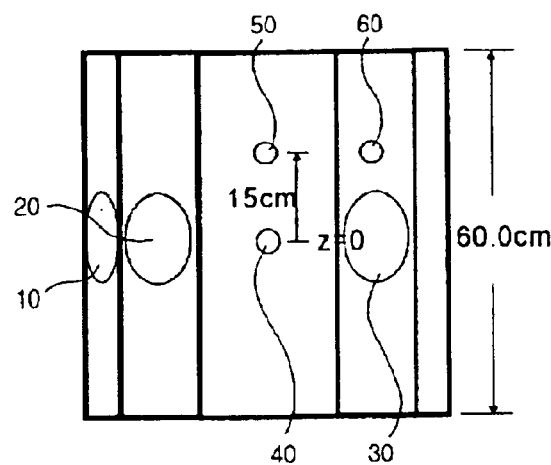

FIG. 4a is a perspective view of an acoustic holography system according to an embodiment of the present invention, and FIGS. 4b and 4c are upper and side views of a speaker experiment device for verifying the acoustic holography system of FIG. 4a, respectively.

Referring to FIGS. 4a to 4c, six speakers 10 to 60 are arranged within an acrylic box 100, and operated independently. Further, in order to measure spectrums for frequency bands of sounds radiated from the individual speakers 10 to 60 and provide reference sound pressures, six reference microphones (not shown) are arranged to be spaced apart from the center of the acrylic box 100 by approximately 1 m. Further, in order to measure the pressures of sounds radiated from the individual speakers 10 to 60, a microphone array 70 is provided.

Further, in order to process attribute data of sound sources, measured through the reference microphones and the microphone array 70 and visualize a hologram, a signal processing means, such as a computer 80, is provided.

In the acoustic holography system having the above construction, a hologram plane is positioned to be spaced apart from the center of the acrylic box 100 by 42.7 cm, and a sound source plane is positioned to be spaced apart from the center of the acrylic box by 32.1 cm.

After the acoustic holography system is constructed as described above, sound pressures on the hologram plane are measured in a vertical direction using the microphone array 70 in which 24 microphones are arranged at intervals of 5 cm in the vertical direction. Further, the sound pressures on the hologram are measured at 60 positions in a circumferential direction while rotating the microphone array 70 by stages at an angle of 6 degrees around the acrylic box 100.

Figure 5:
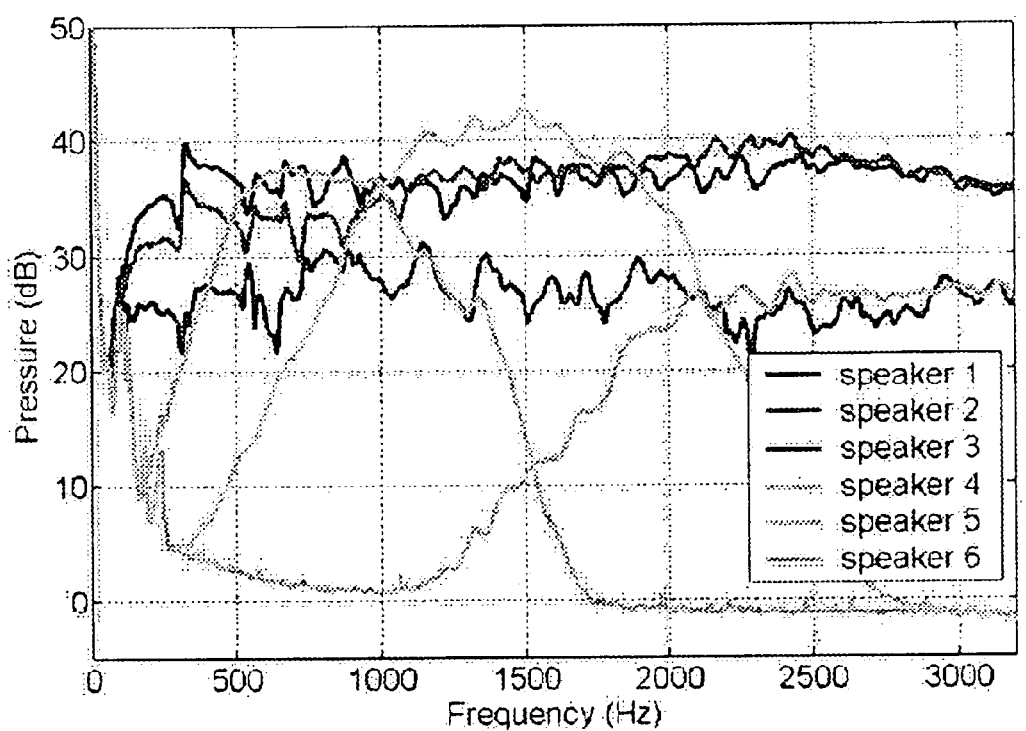

FIG. 5 is a graph showing the spectrum of a sound pressure measured by a single reference microphone if only a single speaker is driven in FIG. 4a.

Figure 6:
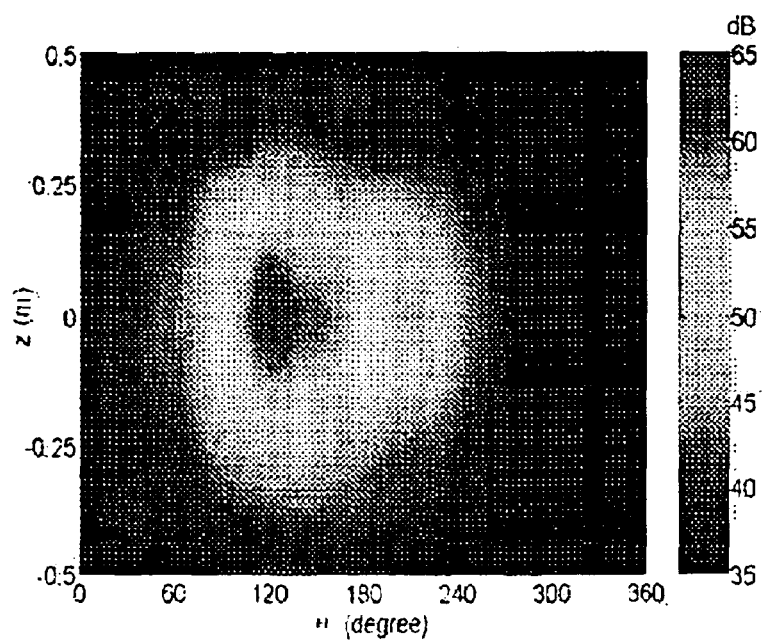
FIG. 6 is a distribution chart of the sound fields of sound pressures on a sound source plane of FIG. 5, obtained by a conventional method.
Figure 7A:
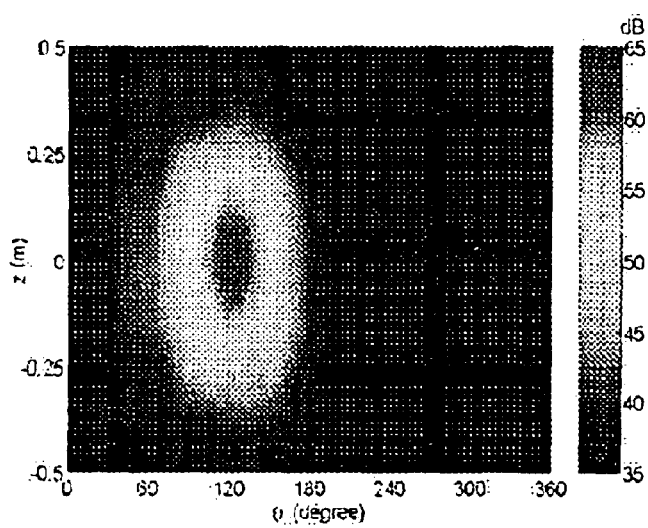
FIGS. 7a to 7d are distribution charts of the sound fields of sound pressures of individual speakers of FIG. 5, obtained by the present invention.
Figure 7B:
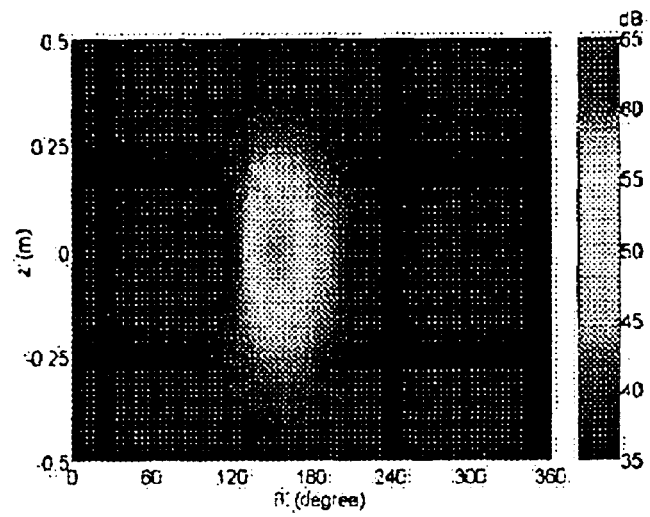
Figure 7C:
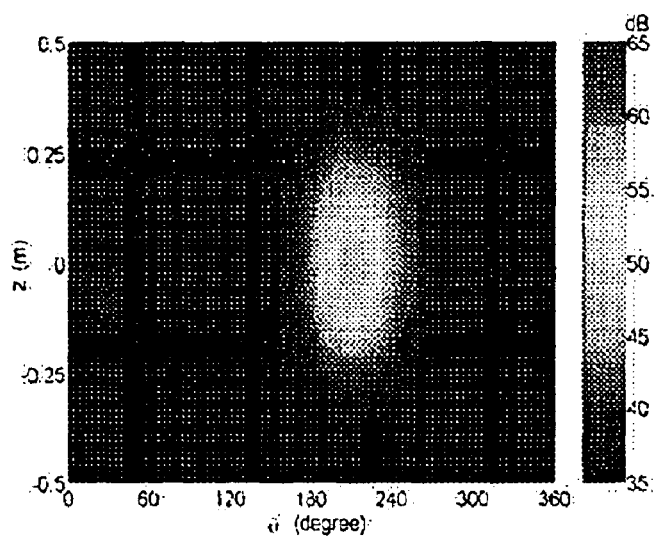
Figure 7D:
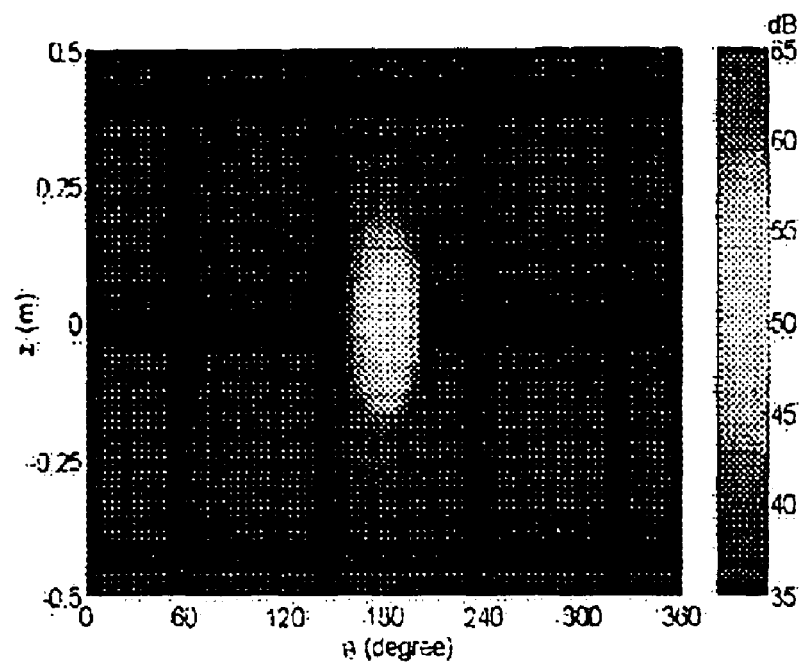

FIG. 6 is a distribution chart of the sound fields of sound pressures on the sound source plane of FIG. 5, obtained by a conventional acoustic holography method.

Referring to FIG. 6, a frequency is 400 Hz, and four speakers are primary sound sources in this frequency band. However, as shown in FIG. 6, only sound fields created by three speakers are vaguely shown and it is difficult to observe a sound field created by the 4th speaker. Further, it can be seen that even the sound fields of the three speakers, observed vaguely, are not clearly discriminated from each other due to a spatial overlap phenomenon.

FIGS. 7a to 7d are distribution charts of the sound fields of sound pressures of the individual speakers of FIG. 5, obtained by the present invention, and respectively show the distribution charts of the sound fields created by the first to fourth speakers.

Referring to FIGS. 7a to 7d, even a sound field of a speaker, which could not be observed in FIG. 6, can be observed, and the sound fields of other three speakers can be more dearly observed.

As described above, the present invention provides a method of visualizing sound fields of individual sound sources using acoustic holography, which discriminates individual sound sources from each other and visualizes the sound fields thereof using sound pressures of the sound sources, obtained using acoustic holography, even though the positions of the sound sources are not known. Therefore, the present invention is advantageous in that there is no need to provide sensors close to the individual sound sources, the resolution of acoustic holography can be improved, and the priorities of the individual sound sources can be determined.

Further, the present invention is advantageous in that, even if the positions of the sound sources have been detected in advance, that is, even in the case where it is difficult to arrange sensors close to the sound sources as in the case of the measurement of automobile tire and engine noises and aero-acoustics, the present invention can discriminate individual sound sources from each other by applying a software approach.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of visualizing sound fields of individual sound sources using acoustic holography, comprising the steps of:
    a) calculating sound pressures on a sound source plane using sound pressures measured on a hologram plane;
    b) extracting a reference sound source locating at a position where a sound pressure has the largest value on the total sound field, and determining the sound pressure at the position as a signal coherent to the reference sound source;
    c) obtaining a sound field of the reference sound source using the signal coherent to the reference sound source;
    d) eliminating the sound field of the reference sound source from the total sound field to get a remaining sound field, and determining whether any remaining sound field exists; and
    e) if any remaining sound field exists at step d), applying the step b) to the step d) to the remaining sound field.

2. The method of visualizing sound fields of individual sound sources according to claim 1, wherein the sound field of the reference sound source at step c) is obtained by calculating contribution of each of the sound sources in a spectral matrix consisting of auto-spectra at individual points on the sound source plane and cross spectra between different points by using the signal coherent to the reference sound source.

3. A computer-readable recording medium for recording a program, which executes the steps of:
    a) calculating sound pressures on a sound source plane using sound pressures measured on a hologram plane;
    b) extracting a reference sound source locating at a position where a sound pressure has the largest value on the total sound field, and determining the sound pressure at the position as a signal coherent to the reference sound source;
    c) obtaining a sound field of the reference sound source using the signal coherent to the reference sound source;
    d) eliminating the sound field of the reference sound source from the total sound field to get a remained sound field, and determining whether any remaining sound field exists; and
    e) if any remaining sound field exists at step d), applying the step b) to the step d) to the remaining sound field.

* * * * *